United States Patent [19]

Berger

[11] Patent Number: 4,869,275
[45] Date of Patent: Sep. 26, 1989

[54] ULTRA-HIGH FILTRATION FILTER
[75] Inventor: Richard M. Berger, Midlothian, Va.
[73] Assignee: American Filtrona Corporation, Richmond, Va.
[21] Appl. No.: 17,488
[22] Filed: Feb. 24, 1987
[51] Int. Cl.⁴ ............................................. A24D 3/06
[52] U.S. Cl. .................................... 131/332; 131/340
[58] Field of Search ...................... 131/331, 332, 340; 401/197, 198

[56] References Cited
U.S. PATENT DOCUMENTS
3,595,245 7/1971 Buntin et al. .
3,615,995 10/1971 Buntin et al. .
4,614,199 9/1986 Berger .

Primary Examiner—V. Millin
Attorney, Agent, or Firm—Fleit, Jacobson, Cohn, Price, Holman & Stern

[57] ABSTRACT

An ultra-high efficiency cigarette filter is formed from a web of entangled ultra-fine melt blown plastic fibers of extremely low bulk density, the fibers on average having a diameter in the range of 0.1 to 4 microns. The web is formed into a substantially cylindrical rod having a bulk density in the range of 0.029 to 0.046 gram per cc and is encapsulated in and supported by an external plastic tube which adheres to the outer surface of the rod over the entire area of contact therebetween. Cigarette filters in accordance with the invention may have filtration efficiencies in excess of 80%. The disclosure also includes processes and apparatus for manufacturing the high efficiency filters.

18 Claims, 2 Drawing Sheets

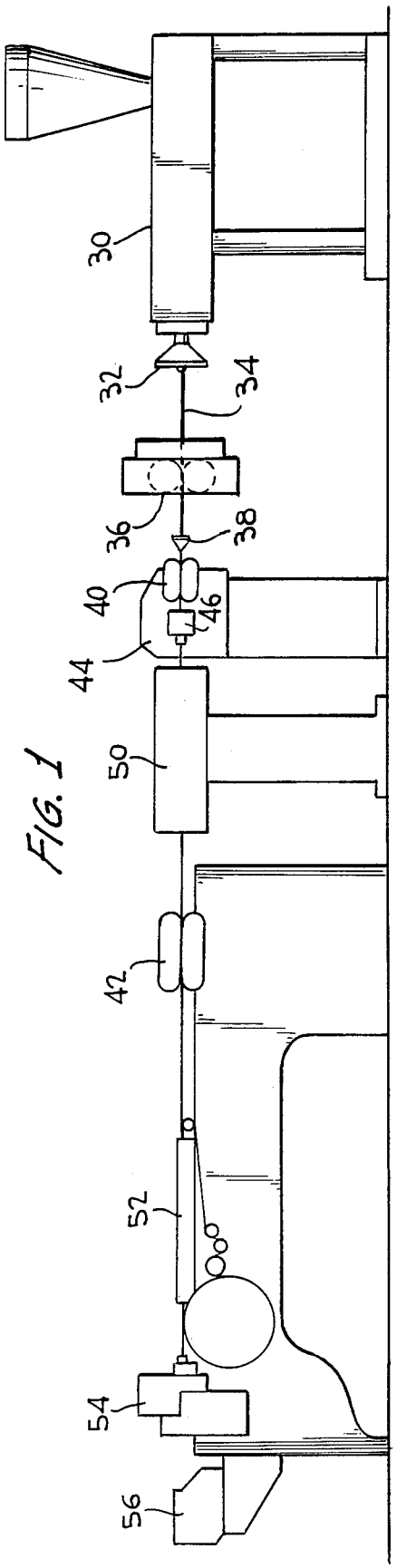
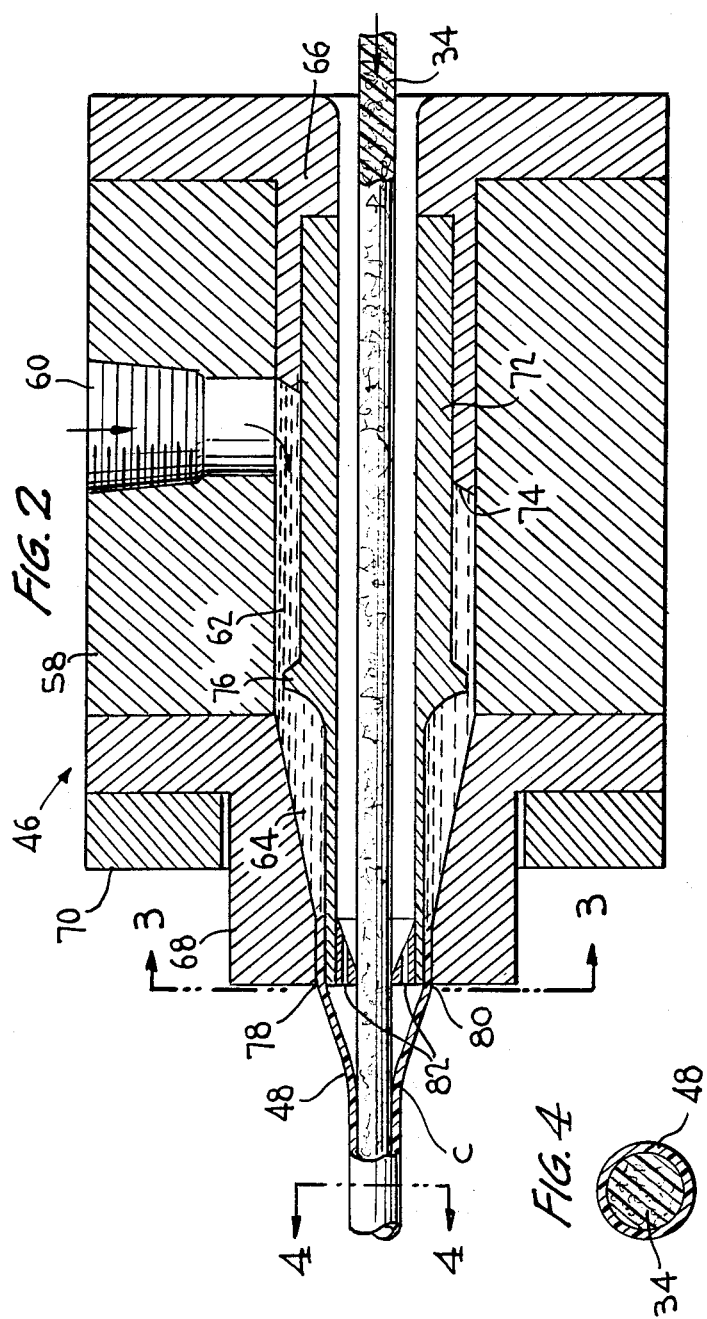
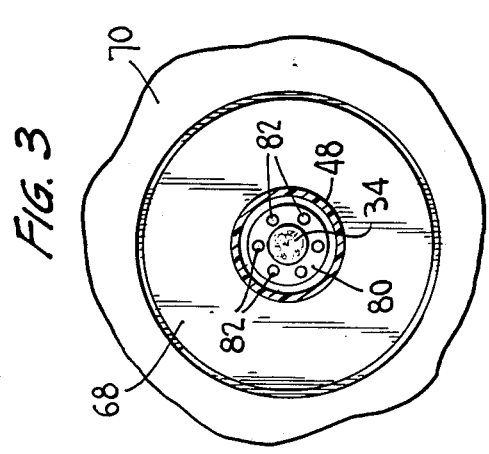

ULTRA-HIGH FILTRATION FILTER

BACKGROUND OF THE INVENTION

This invention relates to gas permeable fibrous bodies, more particularly for use as tobacco smoke filters in cigarettes and other smoking articles. It is anticipated, however, that the primary use for fibrous bodies in accordance with the invention will be in the field of cigarette filters. Accordingly, the discussion which follows will be oriented toward this application of the invention but without limiting intent.

Considerable effort has been expended in recent times in developing the ultimate cigarette filter. In fabricating filters for use in connection with cigarettes and the like, a number of considerations, frequently conflicting, must be taken into account and balanced. Filtration efficiency (i.e., the ability of a filter to remove undesirable constituents from tobacco smoke) is clearly a primary consideration, but this must frequently be compromised in order for the filter to possess other properties which make it commercially practicable and acceptable. Such other properties include pressure drop, taste, hardness and cost. Generally, it may be stated that a major object in the development of the optimum cigarette filter is to obtain maximum filtration efficiency consistent with an acceptable combination of the other parameters.

Reasonably high filtration efficiency, or so called "low tar" cigarette filters have been available for some time. An effective filter of this type is disclosed, for example, in my earlier U.S. Pat. No. 3,533,416. This filter found significant commercial success but is rather high in cost and has a limit of about 70% filtration. Relatively high filtration efficiencies have also been obtained with ventilated-type filters in which the smoke is diluted with inhaled air, but such filters tend to suffer from a loss of taste.

An alternative approach to the manufacture of high efficiency cigarette filters was a proposal disclosed, for example, in prior U.S. Pat. Nos. 3,595,245 and 3,615,995 which utilizes a tow or roving of extremely fine entangled melt blown plastic fibers to form a filter rod. In the melt blown manufacturing process, a large array of fibers are extruded in a stream of pressurized gas through individual extrusion dies in a die head, and the fibers are gathered together by one or another technique to form an entangled tow or roving ultimately used to form a filter rod. The melt blown process can be controlled to produce extremely fine fibers down to about 0.01 microns in diameter and accordingly the process would appear to lend itself to the production of filter rod material of very high filtration efficiency because of the large retention area available in a tow or roving made from such fine fiber material.

In practice, however, applicant is unaware of any cigarette filter made by the melt blown process which had a filtration efficiency substantially over 70%. This is believed to be due to the fact that to obtain a usable pressure drop with such ultra-fine fibers, the bulk density of the filter should be below about 0.1 gram per cc, and with ultra-fine fibers below about 8 microns in diameter, if the bulk density is reduced below 0.1 gram per cc, the physical properties of the resultant product, particularly its structural integrity, are unacceptable for use as a cigarette filter. While resins and other bonding agents can be added to the tow to improve its structural integrity, these can affect both pressure drop and filtration characteristics.

SUMMARY OF THE INVENTION

It is a primary object of the present invention to provide a means whereby the ultra-fine plastic fibers which can be produced by the melt blown process can be used at a sufficiently low bulk density to form a filter rod for cigarettes of ultra-high filtration efficiency while maintaining the structural integrity of the rod.

Another object of the invention is to provide a relatively low cost, relatively high retention gas pervious fibrous body which may be used in cigarette and other tobacco smoke filters.

Yet another object of this invention is to provide filter elements, filter rods and filtered cigarettes incorporating such filter elements which have ultra-high filtration efficiency with good taste and good mechanical properties and which can be made in a highly efficient commercially acceptable manner using a novel method and apparatus according the instant inventive concepts.

I have found, in accordance with the invention, the above objects can be achieved, inter alia, by encapsulating a filamentary tow in a surrounding tube of substantially impervious plastic, which may be the same material as the tow, but need not be, with substantially continuous adhesion between the tow and the inner surface of the tube substantially over the entire contacting areas thereof. In the case of a tow made of extremely fine melt blown plastic filaments of low bulk density, i.e., a fiber diameter of below about 8 microns, and a bulk density below 0.1 gram per cc, adhesion of the tube around the tow gives the tow the structural strength and stability needed for a cigarette filter, and the adhesion of the tube and tow prevents smoke bypass therebetween. Moreover, the tube material is generally more cost effective than the tow material, so that an ultra-high efficiency filter of the order of 80% efficiency or higher can be produced at relatively low cost. Typically, the tube wall thickness may be of the order of about 1 to 10 mil. and generally will be about 5 to 6 mil., the thickness depending on the material and required physical properties.

For use as a cigarette filter, the outer diameter of the tow-encapsulating tube is formed to correspond generally to the outer diameter of a cigarette tobacco rod, and if desired the tube may be covered by a paper plug wrap. Alternatively, the filter may be attached directly to a tobacco rod by means of a tipping wrap without the use of an intermediate plug wrap.

Various processes are considered applicable in forming tube-encapsulated fibrous bodies in accordance with the present invention. For example, the fibrous tow can be wrapped with sheet material to form the encapsulating tube with heat or adhesive applied between the tow and sheet and with the sheet being suitably seamed and sealed. Alternatively, the tow material may be stuffed lengthwise into a preformed straw-like tube, with suitable bonding being provided therebetween. In a preferred form of the invention, however, molten tube material is continuously extruded from a tubular extrusion die around a melt blown filamentary tow which is drawn continuously through the center of the die, with the heated extrudate providing self-adhesion to the tow before it cools to form the tube. The tow itself may be formed by techniques as described in the aforesaid U.S. Pat. Nos. 3,595,245 and 3,615,955, or it may be formed by equivalent melt blown processes capable of forming ultra-fine filaments and by collecting the filaments, for example, on a porous surface and pneumatically gathering the filaments into an entangled web or roving or the like which, when cooled, are bonded at their points of contact to form a smoke pervious rod-like member.

While the invention, as applied to cigarette filters is primarily intended for use with ultra-fine fibers of the order from about 0.1 to 8 microns in diameter in order to obtain optimum filtration efficiencies, nevertheless the invention is also useful with larger diameter fibers if, for example, a less efficient, but more cost effective filter is required.

Additional features and advantages of the invention will become apparent from the ensuing description and claims read in conjunction with the attached drawings.

BRIEF DESCRIPTION OF THE DRAWINGS

FIG. 1 is a diagrammatic side elevational view of a processing line apparatus for use in making cigarette filter rod material in accordance with the invention;

FIG. 2 is an enlarged sectional elevational view of an extrusion die forming a part of the apparatus;

FIG. 3 is a partial end view on line 3—3 of FIG. 2;

FIG. 4 is an enlarged sectional view on line 4—4 of FIG. 2;

DESCRIPTION OF THE PREFERRED EMBODIMENTS

Figure 5:
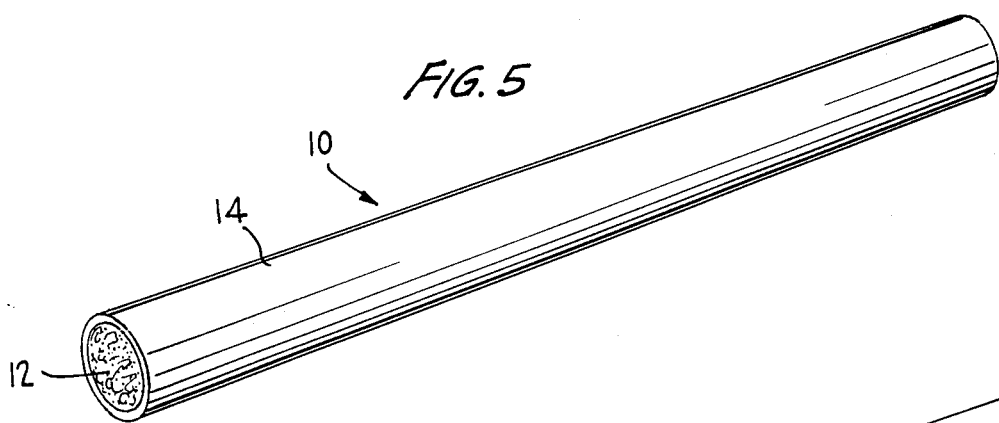
FIG. 5 is a perspective view of a fibrous body, such as a cigarette filter rod, in accordance with the invention.

Referring firstly to FIG. 5, there is shown a cigarette filter rod 10 comprising a central core 12 in the form of a gas pervious fibrous tow or roving, and a surrounding substantially impervious, plastic support and encapsulating tube 14 for the tow. Although not evident in the drawing, the inner surface of the tube is substantially continuously bonded to the outer surface of the tow substantially throughout their entire contacting areas. The tow is effectively a web of entangled melt blown filaments of a thermoplastic material which has been formed by a melt blown extrusion process of the type previously referred to, the filaments preferably being exceedingly small sized, i.e., no larger than about 8 microns in diameter and possibly down to about 0.1 micron in diameter, and the tow having an extremely low bulk density, i.e., under about 0.1 gram per cc. Tube 14 may be of the same basic plastic as is used for the tow filaments and continuously surrounds the tow although different tube materials may be utilized so long as they have the necessary properties to be discussed hereinafter to insure bonding between the tube and core materials. Adhesion between the tow and tube, which in the case of thermplastic materials, may be self-adhesion, provides support for the tow so that a self-sustaining filter rod with good structural integrity is provided and avoids by-passing of smoke between the tube and tow when used as a cigarette filter. The wall thickness of the supporting encapsulating tube may in the range of 1 to 10 mil. and generally, a range of about 5 to 6 mil. is preferred.

Figure 6:
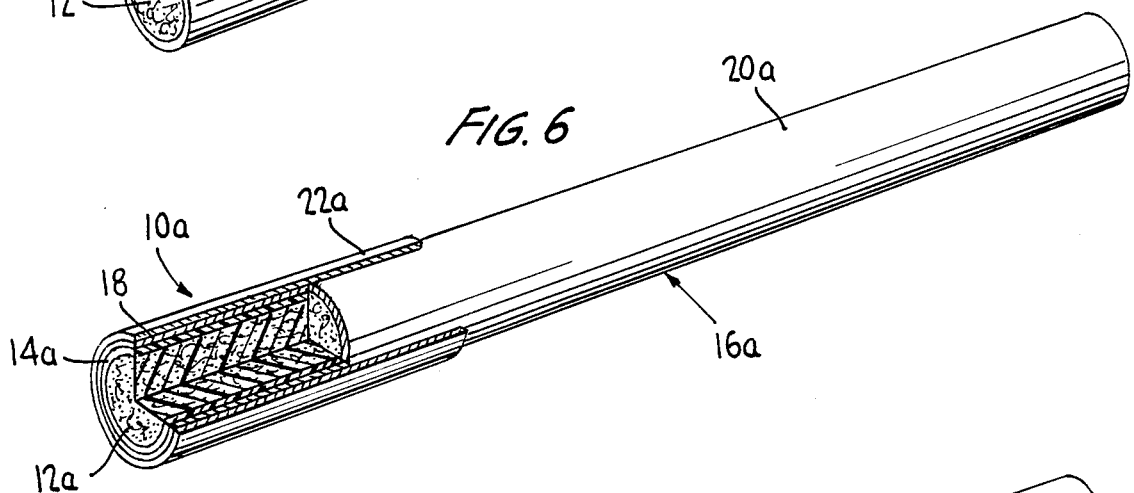
FIG. 6 is perspective view, partially cut away, of a cigarette having a filter according to the invention.
Figure 7:
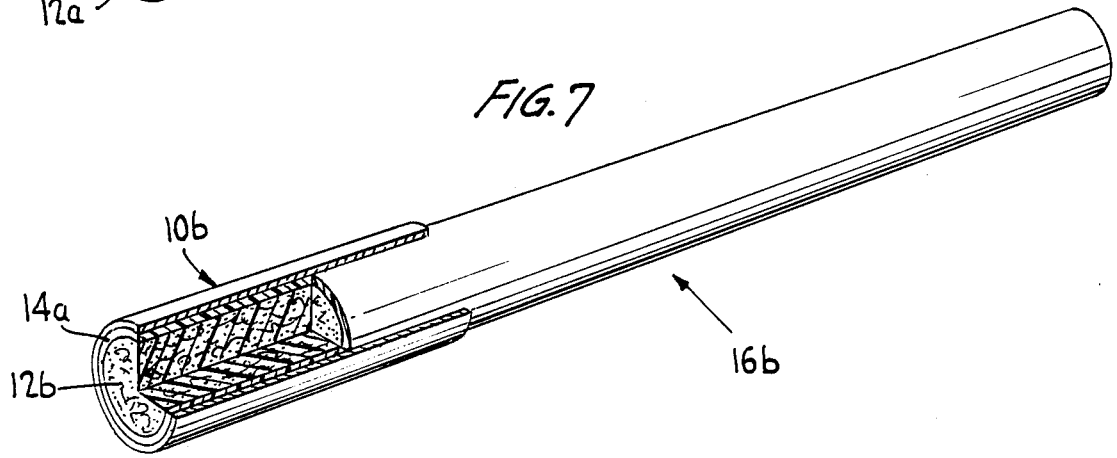
FIG. 7 is a view similar to FIG. 6 showing a modification.

FIG. 6 shows a cigarette 16a formed from a filter element 10a cut to length from a filter rod 10 as shown in FIG. 5, the filter being covered by a paper or light plug wrap layer 18 and connected to a tobacco rod 20a by a tipping wrap 22a. FIG. 7 shows a similar cigarette 16b formed from a filter element 10b cut to length from rod 10, a tobacco rod 20b and a tipping wrap 22b, the plug wrap in this case being eliminated.

It will be seen from the above and following detailed description of the preferred inventive concepts that smoke received from the ultimate filtered cigarette need not be air diluted to provide ultra-high filtration efficiency, i.e., over 70%, and preferably over 80%, removal of total particulate material. Of course, air dilution can be provided in any conventional manner if desired for particular applications, but generally is not necessary in a filtered cigarette according to the instant inventive concepts.

Cigarette filters made in accordance with the invention using a melt blown tow of ultra-fine fibers below about 8 microns in diameter and an ultra-low bulk density below about 0.1 gram per cc provide filtration efficiencies significantly in excess of commercially available filters, as evidenced by the following table. The table shows comparative results as between a typical commercial filter and three different ultra-high filtration (UHF) filters in accordance with the invention. The table further illustrates that surprising improvements are obtained in filtration efficiency by reductions in fiber size and density.

TABLE I

|  | Tip PD Inches $H_2O$ | Fiber Size Microns | Fiber Wt. Per 100 mm Rod | Density Grams Per cc | Filtration Efficiency % (Total Particulate Material) |
|---|---|---|---|---|---|
| Control: Commercial Brand | 3.1 | 19.0 | .650 g | 0.138 | 54.7 |
| UHF Filter - Polypropylene Web | 3.1 | 3.5 | .217 g | 0.046 | 72.8 |
| UHF Filter - Polypropylene Web | 3.1 | 3.0 | .166 g | 0.035 | 83.3 |
| UHF Filter - Polypropylene Web | 3.1 | 2.5 | .134 g | 0.029 | 84.5 |

It is evident from the table that the examples of UHF filters shown therein all use polypropylene web material with diameters in the 2.5–3.5 micron range, these being considered the optimum diameters for effective filtration. The preferred range of filament diameters is 1 to 4 microns, the high efficiency filtration range of filament diameters being about 0.1 to 8 microns, while as previously noted, the invention can also be used with larger diameter melt blown filaments if, for example, lower efficiency, less expensive, filters are required. Also, while polypropylene is used in the examples, the invention can use any thermoplastic material for the melt blown filter core and for the encapsulating tube and the core and tube may be the same or different plastics.

Examples of suitable materials are: polyolefins (polypropylene and polyethylene), ethylene/propylene copolymers, polystyrene, polyester (polyethylene terephthalate), nylon (6, 66 and 610), polymethylmethacrylate, and even cellulose acetate.

Turning now to FIGS. 1 to 4, there is illustrated one preferred method and apparatus in accordance with the invention for manufacturing the elongate fibrous bodies, particularly cigarette filter rods in the case of the apparatus illustrated. Referring firstly to FIG. 1, there is diagrammatically illustrated a complete processing line for such a manufacture, the line running from right to left in the drawing. Thus, reference numeral 30 denotes an extruder having a melt blown die head 32 for continuously forming multiple ultra-fine plastic filaments as described above which are drawn together into a web 34. The die head 32 may be constructed and have ancillary equipment in the manner disclosed in the aforesaid U.S. Pat. Nos. 3,595,245 and 3,615,995 so as to form a circular web of entangled plastic filaments or, alternatively, the die head may be configured to produce a substantially flat web in which the individual filaments become entangled by self-adhesion upon mutual contact outside of the die head before they have cooled. In the case of a flat web 34, it may be drawn through a set of collection rolls 36 and a funnel 38 (for changing its shape into circular form) by a conventional belt-type pulling device 40. A second belt-type pulling device 42 is coordinated with device 40 for pulling the web through an extruder 44 having a die head 46 for extruding plastic tubing 48 (see FIGS. 2-4) over the web as will be described in more detail below, and through a water vacuum sizing bath 50, also known per se, for cooling the tube and accurately controlling the outside diameter and roundness thereof. From the pulling device 42, the tube-encapsulated web may be passed through a garniture 52, known per se, for covering the tube with a plug wrap material if required, to a cutter head 54 cutting the continuous tube-encapsulated web into suitable filter rod lengths, and to a catcher's belt 56.

Apart from the tube extruder and die head 44, 46, the above described apparatus is generally well known in the cigarette filter making art and will not be described in further detail. The tube extruder and die head 44, 46, however, is described in more detail below, with particular reference to FIGS. 2-4.

Die head 46 includes a die head body 58 having an inlet passage 60 for receiving molten plastic from extruder 44 and delivering same to an annular extrusion duct 62 which communicates with a converging outlet duct 64 in an outlet collar 68 held on the front of body 58 by an attachment ring 70 or the like. A tubular insert 72 extends coaxially substantially the entire length of ducts 62 and 64 and is supported at the back of the die head in a flanged socket 66. The socket has an inclined front face 74 for equalization of extrudate distribution and pressure. Insert 72 includes an outwardly extending restriction ring 76 for creating back pressure within the die head. It is evident that a tubular extrusion die orifice 78 is defined between the end of insert 72 and outlet duct 64, the diameters and thickness of which are dependent on the respective diameters of the duct and insert. Internally of insert 72 at its outlet end, there is situated a tapered ring insert 80 with a circumferential array of pressure-equalization through-holes 82. The inner diameter of the ring 80 conforms substantially to the diameter of web 34.

In operation, web 34 is drawn through the center of tubular insert 72 by the pulling devices 40, 42, with the speeds thereof being controlled so that the web is maintained in a substantially relaxed state and substantially in the center of insert 72 so that it is not substantially heated in passage through the die. In this respect, ring 80 serves as a guide for the web and any heat imparted to the web by contact with the ring is minimized because the contact is substantially instantaneous due to the taper of the ring. It is evident that tube 48 is continuously extruded over web 34 and drawn down onto the web externally of the die head before it has cooled. Accordingly, upon contact of the tube with the web (at point C in FIG. 2) continuous self-adhesion occurs between the substantially molten tube and the web. As previously indicated, the tube is then cooled and accurately sized by bath 50 in a conventional manner to form the tube encapsulated product of the invention.

In the process just described, adhesion between the tube and the web is accomplished by forming a still molten tube over a substantially cooled and non-molten web. As indicated above, the tube and web material are preferably the same, but may be different so long as the melting point of the tubular material is at or above the melting point of the web material. This insures the instantaneous melting or softening of the outer surface of the rod-like web material to enhance the bonding, providing good support for the resultant product enabling efficient handling in conventional cigarette making machinery and precluding by-passing of smoke between the core and tube in the ultimate filter element. In other processes, which are useful, but not preferred, the tube may be cooled and the exterior surface of the web may be rendered molten to provide the required adhesion therebetween or separate adhesive may even be used.

While only preferred embodiments of the invention have been described herein, the invention is not limited thereby and modifications can be made within the scope of the attached claims.

I claim:

1. An elongate fibrous filter body comprising a gas pervious inner core of entangled melt-blown ultra-fine plastic fibers and a surrounding plastic tube for supporting the core, the tube being substantially continously adhered around the core over substantially the entire area of contact therebetween, the fibers, on average having a diameter in the range 0.1 to 4 microns and the core having a bulk density in the range 0.029 to 0.046 gram per cc.

2. An article as defined in claim 1, in the form of a cylindrical filter rod for filtering tobacco smoke.

3. An article as defined in claim 2, in the form of a filter rod for cigarette filters.

4. An article as defined in claim 1, wherein the fibers, on average, have a diameter in the range of 2.5 to 3.5 microns.

5. An article as defined in claim 1, wherein the tube has a wall thickness in the range of 1 to 10 mil.

6. An article as defined in claim 5, wherein the tube has a wall thickness in the range of 5 to 6 mil.

7. An article as defined in claim 1, wherein the core is formed from a thermoplastic selected from the group consisting of polyolefins, ethylene/propylene copolymers, polystyrene, polyesters, nylons, cellulose acetate, and polymethylmethacrylate.

8. An article as defined in claim 1, wherein the tube is formed from a thermoplastic selected from the group consisting of polyolefins, ethylene/propylene copolymers, polystyrene, polyesters, nylons, cellulose acetate, and polymethylmethacrylate.

9. An article as defined in claim 1, wherein the core is formed from the same plastic material as the tube.

10. A tabacco smoke filtering means comprising a smoke pervious rod of entangled melt blown plastic fibers having an average diameter in the range 0.1 to 4 microns and a bulk density in the range 0.029 to 0.046 gram per cc, and a plastic tube for supporting the rod, the tube being adhered to the outer surface of the rod to substantially preclude smoke bypass between the rod and the tube.

11. The invention as defined in claim 10, wherein the average diameter of the fibers is in the range of 1 to 4 microns.

12. The invention as defined in claim 11, wherein the average diameter of the fibers is in the range of 2.5 to 3.5 microns.

13. The invention as defined in claim 10, wherein the thickness of the tube is in the range of 1 to 10 mil.

14. The invention as defined in claim 13, wherein the thickness of the tube is in the range of 5 to 6 mil.

15. The invention as defined in claim 10, wherein the rod and the tube is each made of a thermoplastic selected from the group consisting of polyolefins, ethylene/propylene copolymers, polystyrene, polyesters, nylons, cellulose acetate, and polymethylmethacrylate.

16. The invention as defined in claim 15, wherein the rod is made of the same plastic as the tube.

17. The invention as defined in claim 10, in combination with a tobacco rod and a tipping wrap securing the filtering means at one end of the tobacco rod to form a cigarette.

18. The invention as defined in claim 17, including a paper plug wrap over the tube under the tipping wrap.

* * * * *